United States Patent [19]

Lozier et al.

[11] 4,049,845

[45] Sept. 20, 1977

[54] METHOD FOR PREPARING FILTER-COATED PHOSPHOR PARTICLES

[75] Inventors: Gerald Scott Lozier, Princeton; Phyllis Brown Branin, Lawrenceville, both of N.J.

[73] Assignee: RCA Corporation, New York, N.Y.

[21] Appl. No.: 664,766

[22] Filed: Mar. 8, 1976

[51] Int. Cl.² .................... B05D 5/06; B05D 5/12
[52] U.S. Cl. .................................... 427/68; 427/218; 427/215; 427/214; 428/403; 428/407; 427/221
[58] Field of Search ............... 427/215, 218, 220, 221, 427/214, 68, 73, 218; 428/403, 407

[56] References Cited

U.S. PATENT DOCUMENTS

| 3,275,466 | 9/1966 | Kell | 427/68 |
| 3,294,569 | 12/1969 | Messineo et al. | 428/403 |
| 3,875,449 | 3/1975 | Byler | 313/466 |
| 3,886,394 | 5/1975 | Lipp | 313/470 |

Primary Examiner—Ronald H. Smith
Assistant Examiner—Sam Silverberg
Attorney, Agent, or Firm—G. H. Bruestle; L. Greenspan

[57] ABSTRACT

Method comprises adsorbing colloidal particles of a latex onto phosphor particles, providing filter particles in a liquid medium, optionally adsorbing colloidal particles of a latex onto the filter particles and combining the phosphor particles and filter particles into a single mixture. The foregoing steps, which are conducted in aqueous media, may be carried out in any order. Thereafter, the combined mixture of phosphor particles with adsorbed colloidal particles thereon and filter particles is coagulated while in an aqueous medium.

12 Claims, No Drawings

METHOD FOR PREPARING FILTER-COATED PHOSPHOR PARTICLES

BACKGROUND OF THE INVENTION

This invention relates to a novel method for preparing filter-coated phosphor particles.

Certain technical terms are used herein as defined by the International Union or Pure and Applied Chemistry and published in *Pure and Applied Chemistry*, 1972, Vol. 31 No. 4, pages 605 to 613. The term filter includes pigments and is defined as a material which has a selected visual color (not black or white) to the human eye when viewed in white light. As used herein, a red filter or red pigment appears to be red and a blue filter or blue pigment appears to be blue to the human eye when viewed in white light.

Filter-coated phosphor particles and their use in viewing screens for cathode-ray tubes have been described previously; for example, in U.S. Pat. Nos. 3,308,326 to S. H. Kaplan, 3,875,449 to W.H. Byler, and 3,886,394 to S. A. Lipp. As disclosed in these patents, filter material may completely cover the phosphor surfaces, or may only partially cover the surfaces of the phosphor particles. The filter material is prepared separately and then deposited onto the surfaces of the phosphor particles. The resulting filter-coated phosphor particles may then be used in the same general manner as uncoated phosphor particles to prepare viewing screens for cathode-ray tubes. It has been found, however, that particles of filter material become separated from their phosphor particles during screen preparation. This separation occurs, for example, when the filter-coated particles are used in the slurry-direct photographic printing method to make multicolor screens where the separation may result in filter particles of one color contaminating light-emitting elements of another color. When filter particles become separated from their phosphor particles, it is more difficult to recycle excess slurry and to reuse salvaged phosphor because of the uncertainty of the content of the filter material therein.

SUMMARY OF THE INVENTION

The novel method for coating phosphor particles with discrete filter particles comprises absorbing colloidal particles of a latex onto phosphor particles, providing filter particles, optionally adsorbing coloidal particles of a latex onto filter particles and combining the phosphor particles and filter particles into a single mixture. These steps, which are conducted in aqueous media, may be carried out in any order. Thereafter, the combined mixture of particles is coagulated in an aqueous medium. The coagulation may be induced by change of pH of the medium, by change of temperature of the medium, by addition of multivalent cations to the medium, by addition of a water-soluble organic solvent, or by other means. After coagulation, the still-wet coagulated material may be used directly in phosphor slurries; or may be detackified (if desired), dried, sieved and stored until it is needed.

Where more than one latex is used, the latexes may be the same or different from one another, but each is a colloidal system consiting essentially of colloidal particles containing a number of macromolecules of organic material in an aqueous continuous phase. The colloidal particles of the latexes are chosen to be attractive to the phosphor particles and the filter particles, which particles may or may not be treated to provide or enhance this effect. The colloidal particles of the latex preferably have anionic or cationic functional groups to enhance their adherence to the phosphor and filter particles and are coagulable in aqueous media. The more successful colloidal particles are of organic polymeric materials which have minimum film-forming temperatures that are substantially below room temperature (20° C).

The filter-coated phosphor particles produced by the novel method have improved chemical stability, and the filter particles have improved adherence to the phosphor particles so that fewer filter particles are liberated during normal procedures for making viewing screens for cathode-ray tubes. As a result, cross-contamination due to liberated filter particles on multicolor screens produced with the filter-coated phosphor particles is reduced. Also, recycled excess phosphor slurry and salvaged filter-coated phosphor each better retain their proportions of filter material to phosphor material.

DETAILED DESCRIPTION OF THE PREFERRED EMBODIMENT

Example 1

Disperse in 200 cc of deionized water about 100 grams blue-emitting cathodoluminescent phosphor, such as silver-activated zinc sulfide powder, 2.0 grams blue filter particles, such as cobalt aluminate pigment, and 1 cc of a 50 weight % aqueous suspension of latex, such as Monflex ethylene vinyl chloride latex No. 4514, marketed by Monsanto Chemical Co., St. Louis, Mo. (average particle size about 0.06 to 0.09 micron). Ultrasonic dispersion for about one minute has been found to be adequate. Then, dilute the dispersed mixture with deionized water to about 1400 cc. For the remaining steps, the mixture is stirred in a 2-liter beaker to provide a vortex two thirds of its depth. Adjust the pH of the mixture to 3.0 with one molar $H_2SO_4$, and stir for about 16 hours whereupon substantially all of the colloidal particles of the latex are adhered to the phosphor and filter particles. Readjust the pH of the mixture to 3.5 with one molar $H_2SO_4$ to correct for any pH increase during stirring. Add 1 cc of an aqueous solution containing 125 grams of $Al(NO_3)_3.9H_2O$ in 300 cc of water into the stirred mixture to complete coagulation of the particles therein. Neutralize the mixture to a pH of 7.0 with one molar $NH_4OH$ over a three-hour time period. Wash the solids in the mixture, and decant untill the system does not maintain a stable form and has a low ionic conductivity. Dry the solids at about 125° to 180° C in a beaker or tray and then sieve the dry material through 150 mesh to provide a free-flowing powder, which is blue-emitting phosphor partially coated with blue filter particles.

Example 2

Follow the procedure of Example 1 except use for the phosphor red-emitting yttrium europium oxysulfide, and for the filter red cadmium sulfo-selenide pigment.

Example 3

Disperse in 2000 cc of deionized water about 600 grams of blue-emitting silver-activated zinc sulfide phosphor powder. Adjust the pH of the dispersion to about 11.0 with ammonium hydroxide. Then stir, and add to the dispersion 48 cc of a 10 weight % aqueous suspension of latex, such as Hycar Latex No. 2600X171, which is a soft, heat-reactive acrylic polymer latex marketed by B.F. Goodrich Chemical Co., Cleveland, Ohio. Substantially all of the colloidal particles of the latex are adhered to the phosphor particles. Adjust the pH to about 3.5 with sufuric acid, then wash the solids twice with deionized water. Disperse the wet solids in about 2000 cc of deionized water, and adjust the pH to 11.0 with ammonium hydroxide. While stirring th dispersin, add about 14.4 grams blue cobalt aluminate pigment to the dispersion. Then adjust the pH of the dispersion to about 2.5 with sulfuric acid whereby the solids therein coagulate. Add an amount of an aqueous solution containing 4.8 grams of $AL(NO_3)_3.9H_2O$ to the coagulated dispersion with stirring to improve cross linking and to detackify the adsorbed colloidal particles. Complete the procedure as described in Example 1 to produce a similar product.

Example 4

Disperse 100 grams blue-emitting phosphor powder in about 600 ml. deionized water containing 7.4 grams latex solution (same as used in Example 3). Mix 4.0 grams blue ultramarine pigment powder in about 150ml. of water containing 1.0 gram PEI 200. PEI 200 is a polyethylene imine marketed by Dow Chemical Co., Midland, Michigan. It is used to provide a positive charge on the ultramarine particles. Slowly stir the phosphor suspension into the ultramarine suspension whereby the solids therein coagulate and continue stirring for about 30 minutes. Then wash by decanting, dry and sieve though 150 mesh.

Example 5

Disperse about 37 grams blue-emitting phosphor powder and about 1 gram cobalt aluminate blue pigment powder in about 100 cc of water. Add about 3.5 cc of B. F. Goodrich Hycar 1570X60 latex (8.6 weight % solids) to the dispersion. Dilute the mixture to 500 cc and add, while stirring, 10 cc of 0.2 molar aqueous magnesium sulfate solution to the diluted mixture. Then wash five times and dry at about 70° C.

Example 6

Disperse about 37 grams blue-emitting phosphor powder and about 1 gram blue pigment powder in about 100 cc of water. Dilute the dispersion to about 1600 cc and add thereto with stirring 3.5 cc of Hycar 1570X60 latex (8.6 weight % solids). Then, add to the mixture 20 cc of 0.2 molar aqueous magnesium sulfate solution. Adjust the pH of the mixture to about 2.5, then add thereto, with stirring, 20 cc of 0.1 molar aqueous aluminum nitrate solution. Adjust the pH of the mixture to about 6.5. Wash the solids 5 times and then dry at about 170° C.

Example 7

Disperse, as by milling in a flint pebble mill, 1.95 kilograms cobalt aluminate blue pigment powder (1.0 micron median particle size) in about 5 liters of water containing a small amount of non-ionic surfactant. Suspend about 114 kilograms chloride-free blue-emitting phosphor powder (13 micron median particle size) in about 1136 liters of water. While stirring the phosphor suspension, add thereto about 3.63 liters latex (25 weight % solids) such as B. F. Goodrich Hycar 2600X171 acrylic latex. Then, adjust the pH of the suspension to about 2.0 with hydrochloric acid and then wash the solids twice by decantation. Resuspend the solids in about 1136 liters of water. While stirring the phosphor suspension, add the pigment dispersion to the phosphor suspension and continue stirring until the suspension is homogeneous. Then, wash the solids twice with deionized water by decantation, dry at about 125 to 200° C and sieve the dry powder through 230 mesh. In the product, the pigment comprises about 2.2 weight percent of the phosphor weight.

GENERAL CONSIDERATIONS

The principal steps in the novel method are: adsorbing colloidal particles from a latex or latexes to the surfaces of the phosphor particles and optionally the filter particles, forming a physical mixture of the phosphor particles and filter particles in an aqueous dispersion and then coagulating, under controlled mixing, the mixture of the phosphor and filter particles by action on the adsorbed colloidal particles. The phosphor particles and filter particles may be any such particles which are substantially insoluble in water. Examples of suitable phosphor particles and filter particles appear in the above-cited patents to Kaplan, Byler and Lipp. The phosphor particles are about 5 to 20 microns in average size. The filter particles are about 0.3 to 1.0 micron in average size.

The usable latexes are aqueous emulsions or sols in which each colloidal particle contains a number of macromolecules. The colloidal particles are about 0.05 to 1.0 micron in average size. The preferred average particle size is less then 0.3 micron. The latexes are ones which may be coagulated or flocculated, as by change of the pH of the latex, or by change of temperature of the latex, or by addition of multivalent ions to the latex, or by addition of a water-soluble organic solvent, or by the addition of suitable concentrations of neutral salts to the latex. The colloidal particles of the latexes may be of any organic polymeric material having a relatively low "minumum film-forming temperature," hereinafter referred to as MFT. The MFT is preferably more than 20° C lower than the temperature at which the novel method is carried out, which temperature is usually about room temperature (20° C). The colloidal particles may, for example, by polymeric materials from any of the following families: styrene-butadienes, polyvinyl acetate homopolymers and copolymers, butadiene acrylonitriles, vinyl pyridines, ethyl vinyl chlorides, acrylics and vinyl maleates.

Colloidal particles of the latexes must be adsorbable on the surfaces of the phosphor particles. Where the adsorption steps are to be done on both the phosphor and filter particles, the adsorption steps may be done separately or together. This adsorption may be aided by selecting anionic latexes (such as carboxylated copolymers of the above latexes except vinyl pyridines) for phosphor and filter particles which exhibit positive zeta potentials when dispersed in water, or cationic latexes (such as vinyl pyridenes or other amine-containing copolymers) for phosphor and filter particles which exhibit negative zeta potentials when dispersed in water, in order to make use of electrostatic forces that are present.

The latexes usable in the novel method are to be distinguished from the gelatin used in the Examples of the above-cited Lipp patent. Gelatins are water-soluble materials which are protective colloids. The colloidal particles of a latex are not water soluble, and dispersions thereof need a protective colloid or other water-soluble material for stabilization. Examples of particular latexes that may be substituted for Monflex latex in the procedure of Example 1 are:

| Trade Name | Chemical Class | Marketer |
|---|---|---|
| Darex 526L | Carboxylated Styrene-Butadiene | W. R. Grace |
| Rhoplex HA-24 | Acrylic | Rohm & Haas |
| Hycar 1872X6 | Butadiene-Acrylonitrile | B. F. Goodrich |
| Hycar 1571X88 | Carboxy Modified Butadiene Acrylonitrile | B. F. Goodrich |
| Dow Latex 893 | Carboxylated Styrene-Butadiene | Dow Chemical |
| Rhoplex HA-8 | Acrylic | Rohm & Haas |
| Rhoplex N-495 | Acrylic | Rohm & Haas |

The amount of latex added should provide a weight of colloidal particles equal to about 0.1 to 2.0 weight percent of the weight of the phosphor particles plus filter particles present in the mixture. The greater the proportion of colloidal particles, the better will be the adherence, but the greater will be the need to detackify the coagulated mixture.

The phosphor and/or filter particles may be surface treated prior to use in the novel process to produce or enhance the desired zeta potential. An example of such a surface treatment is to adsorb an aluminum hydrosol on the phosphor particles and/or the filter particles to provide or improve the positive charge on these particles in an aqueous medium. Positive charges enhance the adsorption of anionic colloidal particles in the latex to these particles in a subsequent process step.

The preferred latexes comprise colloidal particles having anionic or cationic functions, to provide adherence upon adsorption to the particles and also to provide sites for cross-linking during and after the coagulation step. In some species of the novel method, cationic functions may be used for adsorbing colloidal particles to negatively-charged phosphors and filter particles. Cationic functions may be used also to provide good cross linking with multivalent anions, such as sulfate, phosphate and citrate ions, to coagulate the mixture and to minimize separation during use. In preferred species of the novel method, anionic funtions, usually due to the presence of functional groups in the colloidal particles of the latex, are used for adsorbing colloidal particles to positively-charged phosphor and filter particles. Anionic functions may be used also to provide good crosslinking with multivalent cations, which are positively charged, to coagulate the mixture and to realize adequate water insolubility. Carboxyl groups have been found to be effective anionic functional groups. Amine groups have been found to be effective cationic functional groups.

The multivalent cations for use with anionic latexes are those forming hydrosols at a pH of less than approximately 5. It is believed that the cations should be precipitated out to provide additional binding of the pigment to the phosphor and hence should hydrolyze at a pH somewhat lower than the near-neutral pH of a conventional slurry. Other requirements are that the cations be compatible with the phosphors, and that they be good flocculants for the colloidal particles of the latex. The better choices of cations are: $Al^{III}$, $Th^{IV}$, $Ce^{III}$, $Ce^{IV}$, $Cr^{III}$, $Ti^{IV}$, $Zr^{IV}$ and rare earth $^{III}$. The anions present probably play a role, as it is known that sulphates and phosphates affect the formation of $Al(OH)_3$, for example. Instead of forming a hydrosol by neutralization, the hydroxol may be formed by the controlled hydrolysis of certain metal-organic compounds. For example, $Ti^{IV}$ can be formed from titanium chelates. Also, aluminum hydrosols can be formed from aluminum sec-butoxide.

In addition to coagulation by introducing controlled amounts of multivalent ions, the coagulation may be achieved by any other known method for destabilizing the mixture. In many cases, a large change in the pH of the mixture will cause the mixture to flocculate as in Example 3. In other cases, the stabilizer in the mixture is rendered ineffective by reaction with another material to cause precipitation as in Example 4. Latexes that are stabilized by electrostatic repulsion forces can be destabilized by adding monovalent and/or divalent salts; such as magnesium sulfate or calcium chloride. The destabilization mechanism is the collapse of the double layer permitting Van der Waal forces to become dominant, as in Example 5.

The colloidal particles residing in the flocculated or coagulated mixture are usually tacky, in which case it may be desirable to detackify them. The tackiness may be the result of their low MFT. Detackification may be achieved in aqueous media by reacting most of the residual functional groups to render them nonfunctional. This may be done by any of the methods used to coagulate the mixture. The tack may be reduced by including organic crosslinking or curing agents in the final wash of the above examples. Typical curing agents that may be used are:

hexamethoxymethylmelamine, methoxy methyl melamine resin such as Uformite MM-83 marketed by Rohm and Haas, Philadelphia, Pa., urea-formaldehyde resins such as Uformite F-492 marketed by Rohm & Haas, and polyamide-epichlorohydrin such as Polycup 172 marketed by Hercules Inc., Wilmington, Del. The hydroxides and oxides of the above multivalent cations used for crosslinking can also function to reduce tack and improve the dry handling properties.

The coagulated mixture may be used directly without drying in phosphor slurries to prepare viewing screens for cathode-ray tubes. It is preferred, however, to dry and sieve the coagulated solids to produce a free-flowing powder. Detackification is important toward producing freeflowing powders. While the filter particles are strongly held to the larger phosphor particles, these larger phosphor particles are not strongly held to one another. Hence, sieving has been found to be adequate for breaking up agglomerates to form free-flowing powders. However, the coagulated solids can be dispersed by ball milling or by other methods normally used for preparing phosphor slurries.

We claim:
1. A method for coating phosphor particles with discrete filter particles comprising
   a. adsorbing in an aqueous medium colloidal particles of a latex onto said phosphor particles,
   b. dispersing filter particles in an aqueous medium,
   c. combining said phosphor particles and said filter particles in an aqueous medium
   d. and coagulating the combined mixture of phosphor particles with adsorbed colloidal particles thereon and filter particles while in an aqueous medium.
2. The method defined in claim 1 wherein the colloidal particles of said latexes are anionic and said phosphor particles and said filter particles each exhibit positive zeta potentials in aqueous suspensions during said adsorbing steps.
3. The method defined in claim 1 wherein the colloidal particles of said latexes are cationic and said phosphor particles and said filter particles each exhibit nega- tive zeta potentials in aqueous suspensions during said adsorbing steps.

4. The method defined in claim 1 including, after step (b) and prior to step (c), the step of adsorbing colloidal particles of a latex onto said filter particles.

5. The method defined in claim 4 wherein said adsorbing steps are conducted in a common aqueous suspension containing both phosphor particles and filter particles.

6. The method defined in claim 4 wherein said adsorbing steps are conducted in separate aqueous suspensions of phosphor particles and filter particles, and then the suspensions containing said phosphor particles and filter particles with adsorbed colloidal particles thereon are combined into a single suspension.

7. The method defined in claim 1 wherein said coagulating step is conducted by changing the pH of an aqueous suspension containing both phosphor particles with adsorbed colloidal particles thereon and filter particles with adsorbed colloidal particles thereon.

8. The method defined in claim 1 wherein said coagulating step is conducted by changing the temperature of an aqueous suspension containing both phosphor particles with adsorbed colloidal particles thereon and filter particles with adsorbed colloidal particles thereon.

9. The method defined in claim 1 wherein said coagulating step is conducted by adding multivalent ions to an aqueous suspension containing both phosphor particles with adsorbed colloidal particles thereon and filter particles with adsorbed colloidal particles thereon.

10. The method defined in claim 1 wherein said coagulating step is conducted by adding multivalent ions to an aqueous suspension containing phosphor particles with adsorbed colloidal particles thereon and filter particles.

11. The method defined in claim 1 wherein prior to step (a) the surfaces of at least one of said filter particles and said phosphor particles are treated to produce thereon surface charges that are opposite in polarity to the colloidal particles to be adsorbed thereon.

12. The method defined in claim 1 wherein said latexes are each colloidal systems consisting essentially of colloidal particles containing a number of macromolecules in an aqueous continuous phase, said colloidal particles having an anionic or a cationic function and a minimum film-forming temperature more than 20° C below room temperature and are coagulable by at least one of (a) change of pH of said system, (b) change of temperature of said system, (c) addition of multivalent cations to said system, (d) addition of a water-soluble organic solvent, and (e) addition of relatively high concentrations of neutral salts.

* * * * *

UNITED STATES PATENT OFFICE
CERTIFICATE OF CORRECTION

PATENT NO. : 4,049,845

DATED : September 20, 1977

INVENTOR(S) : Gerald Scott Lozier and Phyllis Brown Branin

It is certified that error appears in the above-identified patent and that said Letters Patent are hereby corrected as shown below:

| | |
|---|---|
| Column 1, line 48 | change "coloidal" to --colloidal-- |
| Column 2, line 49 | change "form" to --foam-- |
| Column 3, lines 7 & 8 | change "th dispersin" to --the dispersion-- |
| Column 5, lines 6 & 7 of table | change "Butadiene Acrylonitrile" to --Butadiene/Acrylonitrile-- |
| Column 5, line 67 | change "hydroxol" to --hydrosol-- |

Signed and Sealed this

Tenth Day of January 1978

[SEAL]

Attest:

RUTH C. MASON
*Attesting Officer*

LUTRELLE F. PARKER
*Acting Commissioner of Patents and Trademarks*